United States Patent
Xu et al.

(10) Patent No.: US 12,041,635 B2
(45) Date of Patent: *Jul. 16, 2024

(54) METHOD AND APPARATUS FOR CONFIGURING TRANSMISSION TIME INTERVAL, DATA TRANSMISSION METHOD AND APPARATUS AND SYSTEM

(71) Applicant: FUJITSU LIMITED, Kawasaki (JP)

(72) Inventors: Haibo Xu, Beijing (CN); Yulong Shi, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,495

(22) Filed: Mar. 16, 2023

(65) Prior Publication Data
US 2023/0224914 A1 Jul. 13, 2023

Related U.S. Application Data

(60) Continuation of application No. 17/110,254, filed on Dec. 2, 2020, now Pat. No. 11,632,784, which is a
(Continued)

(51) Int. Cl.
*H04J 3/00* (2006.01)
*H04L 1/00* (2006.01)
(Continued)

(52) U.S. Cl.
CPC .............. *H04W 72/23* (2023.01); *H04L 1/00* (2013.01); *H04L 1/1812* (2013.01);
(Continued)

(58) Field of Classification Search
CPC . H04W 72/0446; H04W 84/12; H04W 84/18; H04W 28/04; H04W 28/06;
(Continued)

(56) References Cited

U.S. PATENT DOCUMENTS 9,363,753 B2 * 6/2016 Damnjanovic ... H04W 52/0209
9,736,735 B2   8/2017 Jung et al.
(Continued)

FOREIGN PATENT DOCUMENTS

CN    101400072 A    4/2009
CN    101615999 A    12/2009
(Continued)

OTHER PUBLICATIONS

CN-102595390-A, Deng et al, Configuration Method And Terminal Of A Safe Mode, 2012, China,English Machine Translation, Configuration Method And Terminal Of A Safe Mode, pp. 1-15 (Year: 2012).*

(Continued)

*Primary Examiner* — Phuongchau Ba Nguyen
(74) *Attorney, Agent, or Firm* — Myers Wolin, LLC

(57) ABSTRACT

A data transmission apparatus, applicable to a UE, the apparatus includes a receiver configured to receive configuration information about data radio bearers (DRBs), the configuration information indicating TTI length to which each DRBs for the UE corresponds, the DRBs being configured by radio resource control (RRC), and receive one or more uplink grant, each of the uplink grants of the one or more uplink grants corresponding to a TTI length different from another TTI length of another uplink grant, a transmitted configured to transmit data using an uplink shared channel corresponding to each TTI length according to an uplink grant in the one or more uplink grants.

9 Claims, 9 Drawing Sheets

1601
a UE receives configuration information about DRBs transmitted by an eNB, the configuration information about DRBs indicating TTI length to which each DRB configured by the eNB for the UE corresponds 1602
the UE establishes a data processing entity of MAC layer and an uplink shared channel corresponding to each TTI length 1603
the UE transmits data according to a received uplink grant by using the established data processing entity of MAC layer and the uplink shared channel corresponding to each TTI length

Related U.S. Application Data division of application No. 15/925,225, filed on Mar. 19, 2018, now abandoned, which is a continuation of application No. PCT/CN2015/090524, filed on Sep. 24, 2015.

(51) Int. Cl.

| | | |
|---|---|---|
| *H04L 1/1812* | (2023.01) | |
| *H04L 1/1867* | (2023.01) | |
| *H04W 72/1268* | (2023.01) | |
| *H04W 72/20* | (2023.01) | |
| *H04W 72/23* | (2023.01) | |
| *H04W 76/27* | (2018.01) | |

(52) U.S. Cl.
CPC ....... *H04L 1/1887* (2013.01); *H04W 72/1268* (2013.01); *H04W 72/20* (2023.01); *H04W 76/27* (2018.02); *H04L 1/1896* (2013.01)

(58) Field of Classification Search
CPC . H04W 72/23; H04W 72/1268; H04W 72/20; H04W 76/27; H04L 1/00; H04L 1/1812; H04L 1/1887; H04L 1/1896
See application file for complete search history.

(56) References Cited

U.S. PATENT DOCUMENTS

| | | | |
|---|---|---|---|
| 10,743,225 B2 | 8/2020 | Kong et al. | |
| 11,387,952 B2* | 7/2022 | Kim | H04L 1/1854 |
| 11,632,784 B2* | 4/2023 | Xu | H04L 1/1887 |
| | | | 370/336 |
| 2009/0286541 A1 | 11/2009 | Maheshwari et al. | |
| 2010/0098011 A1 | 4/2010 | Pelletier et al. | |
| 2010/0165953 A1 | 7/2010 | Chen et al. | |
| 2012/0093128 A1 | 4/2012 | Song et al. | |
| 2012/0140743 A1* | 6/2012 | Pelletier | H04W 76/28 |
| | | | 370/335 |
| 2013/0028207 A1 | 1/2013 | Okubo et al. | |
| 2014/0056224 A1 | 2/2014 | Rubin et al. | |
| 2016/0095137 A1* | 3/2016 | Chen | H04L 27/2601 |
| | | | 370/329 |
| 2017/0164363 A1 | 6/2017 | Zhang et al. | |
| 2017/0251492 A1 | 8/2017 | Andersson et al. | |
| 2018/0048498 A1* | 2/2018 | Stern-Berkowitz | |
| | | | H04L 5/0091 |
| 2018/0124829 A1* | 5/2018 | Lee | H04W 72/12 |
| 2018/0242317 A1* | 8/2018 | Marinier | H04W 56/001 |
| 2018/0270869 A1 | 9/2018 | Tsai | |
| 2019/0364605 A1* | 11/2019 | Loehr | H04W 72/56 |
| 2020/0107235 A1 | 4/2020 | Peisa et al. | |

FOREIGN PATENT DOCUMENTS

| | | | | |
|---|---|---|---|---|
| CN | 102595390 A | * | 7/2012 | ............ H04L 63/06 |
| CN | 102595599 A | | 7/2012 | |
| CN | 101400072 B | | 12/2012 | |
| CN | 104468030 A | | 3/2015 | |
| CN | 102595390 B | * | 4/2019 | ............ H04L 63/06 |
| EP | 2 665 320 A1 | | 11/2013 | |
| EP | 3 179 654 A1 | | 6/2017 | |
| VN | 10027552 B | | 2/2021 | |
| WO | 2014/129849 A1 | | 8/2014 | |
| WO | 2014157836 A1 | | 10/2014 | |
| WO | 2017/078786 A1 | | 5/2017 | |
| WO | WO-2023080484 A1 | * | 5/2023 | ............ H04W 28/02 |

OTHER PUBLICATIONS

International Search Report issued for corresponding International Patent Application No. PCT/CN2015/090524 and mailed on Jun. 22, 2016. English translation attached.
Written Opinion issued for corresponding International Patent Application PCT/CN2015/090524 and mailed on Jun. 22, 2016. English translation attached.
Notification of Reasons for Refusal issued by the Japan Patent Office for corresponding Japanese Patent Application No. 2018-514375, mailed on Mar. 26, 2019, with an English translation.
Extended European search report with supplementary European search report and the European search opinion issued by the European Patent Office for corresponding European Patent Application No. 15904415.5-1219, mailed on Mar. 27, 2019.
Intel Corporation, "Effect of UE and eNB processing times on TCP performance", Agenda Item: 7.11, 3GPP TSG-RAN WG2 Meeting #91, R2-153810, Beijing, China, Aug. 24-28, 2015.
First Notification of Office Action and Search Report issued by the China National Intellectual Property Administration for corresponding Chinese Patent Application No. 201580082888.0, dated Mar. 19, 2020, with an English translation.
Restriction Requirement issued by the United States Patent and Trademark Office for corresponding U.S. Appl. No. 15/925,225, electronically delivered on Apr. 22, 2019.
Non-Final Office Action issued by the United States Patent and Trademark Office for corresponding U.S. Appl. No. 15/925,225, electronically delivered on Jul. 25, 2019.
Final Office Action issued by the United States Patent and Trademark Office for corresponding U.S. Appl. No. 15/925,225, electronically delivered on Dec. 20, 2019.
Non-Final Office Action issued by the United States Patent and Trademark Office for corresponding U.S. Appl. No. 15/925,225, electronically delivered on Apr. 13, 2020.
Final Office Action issued by the United States Patent and Trademark Office for corresponding U.S. Appl. No. 15/925,225, electronically delivered on Sep. 9, 2020.
Second Notification of Office Action issued by the China National Intellectual Property Administration for corresponding Chinese Patent Application No. 201580082888.0, dated Nov. 13, 2020, with an English translation.
Third Notification of Office Action issued by the China National Intellectual Property Administration for corresponding Chinese Patent Application No. 201580082888.0, dated Apr. 30, 2021, with an English translation.
Non-Final Office Action issued by the United States Patent and Trademark Office for corresponding U.S. Appl. No. 17/110,254, electronically delivered on Sep. 1, 2022.
Notice of Allowance issued by the United States Patent and Trademark Office for corresponding U.S. Appl. No. 17/110,254, electronically delivered on Dec. 16, 2022.

* cited by examiner

METHOD AND APPARATUS FOR CONFIGURING TRANSMISSION TIME INTERVAL, DATA TRANSMISSION METHOD AND APPARATUS AND SYSTEM

CROSS REFERENCE TO RELATED APPLICATIONS

This application is a continuation application of U.S. application Ser. No. 17/110,254 filed on Dec. 2, 2020, now pending, which is a divisional application of U.S. application Ser. No. 15/925,225 filed on Mar. 19, 2018, now abandoned, which is a continuation application of International Application PCT/CN2015/090524 filed on Sep. 24, 2015, the entire contents of each are incorporated herein by reference.

FIELD

This disclosure relates to the field of communications technologies, and in particular to a method and an apparatus for configuring transmission time interval, a data transmission method and apparatus and a system.

BACKGROUND

Transmission time interval (TTI) refers to a minimal time unit scheduling transmission of a data block. In a current long-term evolution (LTE) system, only one type of fixed TTI length, i.e., TTI of length 1 ms, is used. In order to further reduce traffic transmission latency and improve traffic throughput and transmission efficiency of a radio link, shorter TTI, such as TTI of length 0.5 ms, shall be introduced into the LTE system.

Diversities of traffics result in diversities of traffic features and quality of service (QoS) of traffics. Hence, traffics with different traffic features and QoS requirements have different requirements on TTI lengths. For example, for traffics with relatively high requirements on latency and relatively small packets, short TTIs are suitable for transmitting them; while for traffics with low requirements on latency and relatively large packets, long TTIs are suitable for transmitting them.

When a user equipment (UE) has multiple traffics with different features and QoS requirements in operation, these traffics may be possibly suitable for being scheduled and transmitted by using TTIs with different lengths, in which case for downlink data transmission, as an eNB is able to learn TTI lengths suitable for scheduling and transmitting every types of traffics, it is able to multiplex packets of traffics applicable to identical TTI length to the same transport block (TB) correctly, and then schedules and transmits the traffics via suitable TTI lengths. And for uplink data transmission, when the UE receives an uplink grant, in multiplexing packets, the UE does not learn which packets of traffics are suitable for being multiplexed to the same TB and which TBs are suitable for transmission at a current uplink grant. Hence, in multiplexing packets, the UE may wrongly multiplex packets of traffics applicable to different TTI lengths into the same TB.

Moreover, in the current LTE system, except a case where uplink space division multiplexing (SDM) is configured, the UE is able to transmit only one TB at each TTI. FIG. 1 gives an example of scheduling and transmission of uplink data in the current LTE system. As shown in FIG. 1, as the TTI has only one type of length and packets of all the traffics can only be transmitted by using this TTI length, the packets of all the traffics may be multiplexed into this TB. Thus, the eNB may allocate sufficient resources for transmission for the UE according to an amount of data in an uplink buffer of the UE. However, in a case where the UE has multiple types of traffics and the different traffics are suitable for being scheduled and transmitted by using different TTI lengths, if the UE can only transmit one data block at each moment, the eNB can only schedule the UE at a certain moment to transmit one TB, even though the eNB learns that the UE has sufficient data in the uplink buffer waiting for being transmitted and the eNB has sufficient resources for being allocated for the UE, and this will result in a situation that resources cannot be fully utilized.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

In order to solve the problem pointed out in the Background, embodiments of this disclosure provide a method and apparatus for configuring transmission time interval, a data transmission method and apparatus and a system.

According to a first aspect of the embodiments of this disclosure, there is provided an apparatus for configuring transmission time interval, applicable to an eNB, the apparatus including:

a configuring unit configured to transmit to a UE configuration information about data radio bearers (DRBs), the configuration information about DRBs indicating TTI length to which each DRB configured by the eNB for the UE is applicable.

According to a second aspect of the embodiments of this disclosure, there is provided an apparatus for scheduling data transmission, applicable to an eNB, the apparatus including:

a scheduling unit configured to schedule one or more uplink grants of a UE, each uplink grant corresponding to one type of TTI length.

According to a third aspect of the embodiments of this disclosure, there is provided an apparatus for configuring transmission time interval, applicable to an eNB, the apparatus including:

a notifying unit configured to, when a UE needs to be handed over, notify a target eNB of TTI length to which each DRB of the UE is applicable.

According to a fourth aspect of the embodiments of this disclosure, there is provided an apparatus for configuring transmission time interval, applicable to a UE, the apparatus including:

a receiving unit configured to receive configuration information about DRBs transmitted by an eNB, the configuration information about DRBs indicating TTI length to which each DRB configured by the eNB for the UE corresponds; and an establishing unit configured to, corresponding to each TTI length, establish a data processing entity of media access control (MAC) layer and an uplink shared channel.

According to a fifth aspect of the embodiments of this disclosure, there is provided a data transmission apparatus, applicable to a UE, the apparatus including:

a receiving unit configured to receive configuration information about DRBs transmitted by an eNB, the configuration information about DRBs indicating TTI length to which each DRB configured by the eNB for the UE corresponds;

an establishing unit configured to, corresponding to each TTI length, establish a data processing entity of MAC layer and an uplink shared channel; and a transmitting unit configured to transmit data using the established data processing entity of MAC layer and the uplink shared channel corresponding to each TTI length according to a received uplink grant.

According to a sixth aspect of the embodiments of this disclosure, there is provided an apparatus for configuring transmission time interval, applicable to a UE, the apparatus including:

a releasing unit configured to release data processing entities of MAC layers and uplink shared channels to which other TTI lengths than a default TTI length correspond when the UE initiates radio resource control (RRC) connection reestablishment.

According to a seventh aspect of the embodiments of this disclosure, there is provided a method for configuring transmission time interval, applicable to an eNB, the method including:

transmitting to a UE configuration information about data radio bearers (DRBs), the configuration information about DRBs indicating TTI length to which each DRB configured by the eNB for the UE is applicable.

According to an eighth aspect of the embodiments of this disclosure, there is provided a method for scheduling data transmission, applicable to an eNB, the method including:

scheduling one or more uplink grants of a UE by the eNB, each uplink grant corresponding to one type of TTI length.

According to a ninth aspect of the embodiments of this disclosure, there is provided a method for configuring transmission time interval, applicable to an eNB, the method including:

when a UE needs to be handed over, notifying a target eNB by an eNB of TTI length to which each DRB of the UE is applicable.

According to a tenth aspect of the embodiments of this disclosure, there is provided a method for configuring transmission time interval, applicable to a UE, the method including:

receiving, by the UE, configuration information about DRBs transmitted by an eNB, the configuration information about DRBs indicating TTI length to which each DRB configured by the eNB for the UE corresponds; and establishing, by the UE, a data processing entity of MAC layer and an uplink shared channel corresponding to each TTI length.

According to an eleventh aspect of the embodiments of this disclosure, there is provided a data transmission method, applicable to a UE, the method including:

receiving, by the UE, configuration information about DRBs transmitted by an eNB, the configuration information about DRBs indicating TTI length to which each DRB configured by the eNB for the UE corresponds;

establishing, by the UE, a data processing entity of MAC layer and an uplink shared channel corresponding to each TTI length; and transmitting data by the UE using the established data processing entity of MAC layer and the uplink shared channel corresponding to each TTI length according to received uplink grant.

According to a twelfth aspect of the embodiments of this disclosure, there is provided a method for configuring transmission time interval, applicable to a UE, the method including:

releasing, by the UE, data processing entities of MAC layers and uplink shared channels to which other TTI lengths than a default TTI length correspond when the UE initiates RRC connection reestablishment.

According to a thirteenth aspect of the embodiments of this disclosure, there is provided a communications system, including an eNB and a UE; wherein, the eNB is configured to:

transmit to the UE configuration information about data radio bearers (DRBs), the configuration information about DRBs indicating TTI length to which each DRB configured by the eNB for the UE is applicable;

and the UE is configured to:

receive the configuration information about DRBs transmitted by the eNB;

establish a data processing entity of MAC layer and an uplink shared channel corresponding to each TTI length;

and transmit data using the established data processing entity of MAC layer and the uplink shared channel corresponding to each TTI length according to received uplink grant.

An advantage of the embodiments of this disclosure exists in that with the embodiments of this disclosure, multiplexing packets of traffics applicable to different TTI lengths by the user equipment to the same transport block for transmission may be avoided, and occurrence of being unable to fully use resources may also be avoided.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

Embodiment 1

Figure 1:
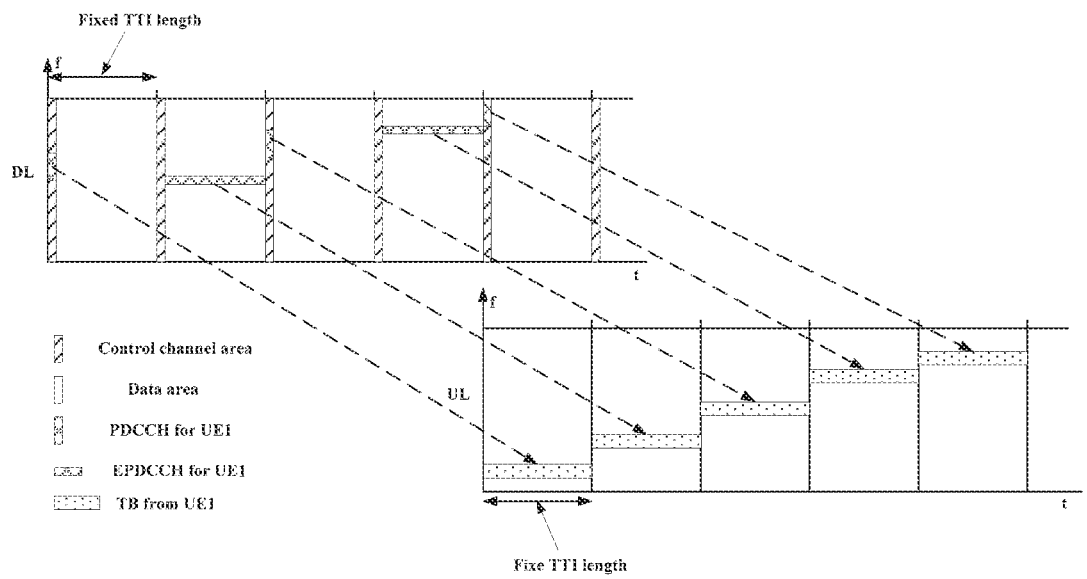
FIG. 1 is a schematic diagram of uplink data scheduling and transmission in the current LTE system.
Figure 2:
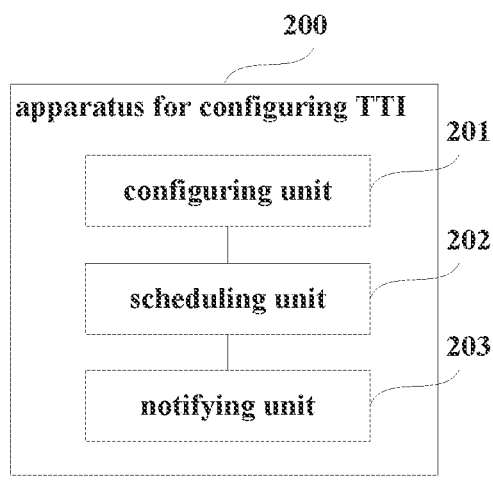
FIG. 2 is a schematic diagram of a structure of one implementation of an apparatus for configuring TTI of an embodiment of this disclosure.

The embodiment of this disclosure provides an apparatus for configuring TI, applicable to an eNB. FIG. 2 is a schematic diagram of the apparatus. As shown in FIG. 2, the apparatus 200 includes a configuring unit 201 configured to transmit to a user equipment (UE) configuration information about data radio bearers (DRBs), the configuration information about DRBs indicating TTI length to which each DRB configured by the eNB for the UE is applicable.

In this embodiment, when configuring a DRB for the UE, the eNB indicates the TTI length used for scheduling and transmission to which the DRB is applicable to the UE. Hence, the UE will not multiplex packets of traffics applicable to different TTI lengths into the same TB, and in a case where the UE has multiple traffics and different traffics are suitable for being scheduled and transmitted by using different TTI lengths, the UE may transmit multiple TBs at the same moment, that is, multiple TBs may be transmitted at the same TTI, thereby avoiding occurrence of being unable to fully use resources.

In this embodiment, as shown in FIG. 2, the apparatus may further include a scheduling unit 202 configured to schedule one or more uplink grants of the UE, each uplink grant corresponding to one type of TTI length.

In one implementation, the TTI lengths to which the uplink grants correspond may be explicitly indicated by fields in downlink control information scheduling the uplink grants. For example, in the downlink control information scheduling the uplink grant, a field is contained and used for explicitly indicating the TTI length to which the uplink grant corresponds. In this implementation, the uplink grants may be carried by PDCCH or by EPDCCH.

In one implementation, the TTI lengths to which the uplink grants correspond may be determined by the type of the downlink control channel carrying the uplink grants. In this implementation, there is a corresponding relationship between the TTI length to which the uplink grant corresponds and a downlink control channel transmitting the uplink grant. The corresponding relationship may be pre-defined, or may be determined by the eNB. For example, the corresponding relationship between the TTI length to which the uplink grant corresponds and a downlink control channel scheduling the uplink grant may be determined in a pre-defined manner, or may be determined in a manner of eNB configuration. For example, when only two types of TTI lengths are configured for the UE, the TTI lengths to which the uplink grants correspond may be differentiated by a downlink control channel transmitting the uplink grants. For example, the TTI length to which an uplink grant scheduled by a PDCCH corresponds is the TTI length 1, such as the TTI length of 1 ms, and the TTI length to which an uplink grant scheduled by an EPDCCH corresponds is the TTI length 2, such as the TTI length of 0.5 ms, and vice versa.

In one implementation, in a case where the UE is configured with a function of carrier aggregation, the TTI lengths to which the uplink grants correspond may be determined by serving cells for the uplink grants. In this implementation, there is a corresponding relationship between the TTI lengths to which the uplink grants correspond and serving cells of the UE to which the uplink grants correspond. For example, the corresponding relationship between the TTI lengths to which the uplink grants correspond and serving cells of the UE to which the uplink grants correspond may be determined in a manner of eNB configuration. For example, in a case where the eNB configures a UE with multiple serving cells, when the eNB configures a serving cell for the UE, the eNB indicates the TTI length supported by the serving cell to the UE. Thus, when the UE receives an uplink grant for a serving cell, it may learn the TTI length to which the uplink grant corresponds.

In this embodiment, when the scheduling unit 202 schedules multiple uplink grants of the UE, the multiple uplink grants may be scheduled by one downlink control information (DCI), or may be scheduled by multiple downlink control information.

In this embodiment, uplink data transmission to which the uplink grant corresponds occurs at an m-th TTI starting from the TTI scheduling the uplink grant, wherein, the length of the TTI is the TTI length to which the uplink grant corresponds, and a value of m is, for example, 4, or 5.

Taking that the value of m is 4 as an example, for an uplink grant scheduled at an n-th TTI, if the TTI length to which the uplink grant corresponds is $k_1$, uplink data transmission to which the uplink grant corresponds occurs at an (n+4)-th TTI of length $k_1$; likewise, for an uplink grant scheduled at an n'-th TTI, if the TTI length to which the uplink grant corresponds is $k_2$, uplink data transmission to which the uplink grant corresponds occurs at an (n'+4)-th TTI of length $k_2$.

In this embodiment, uplink data transmission to which uplink grants scheduled at different TTIs correspond may be overlapped temporally. That is, the UE may transmit multiple TBs at the same moment, thereby avoiding occurrence of a case where the UE has sufficient data waiting for being transmitted and the eNB has also sufficient resources but is unable to fully utilize the resources.

Still taking the above as an example, the uplink data transmission at the (n+4)-th TTI of length $k_1$ and the uplink data transmission at the (n'+4)-th TTI of length $k_2$ may be overlapped temporally.

The above description is illustrative only, and what is different is that whether uplink data transmission to which uplink grants scheduled at different TTIs correspond is overlapped is dependent on a scheduling condition.

Figure 3:
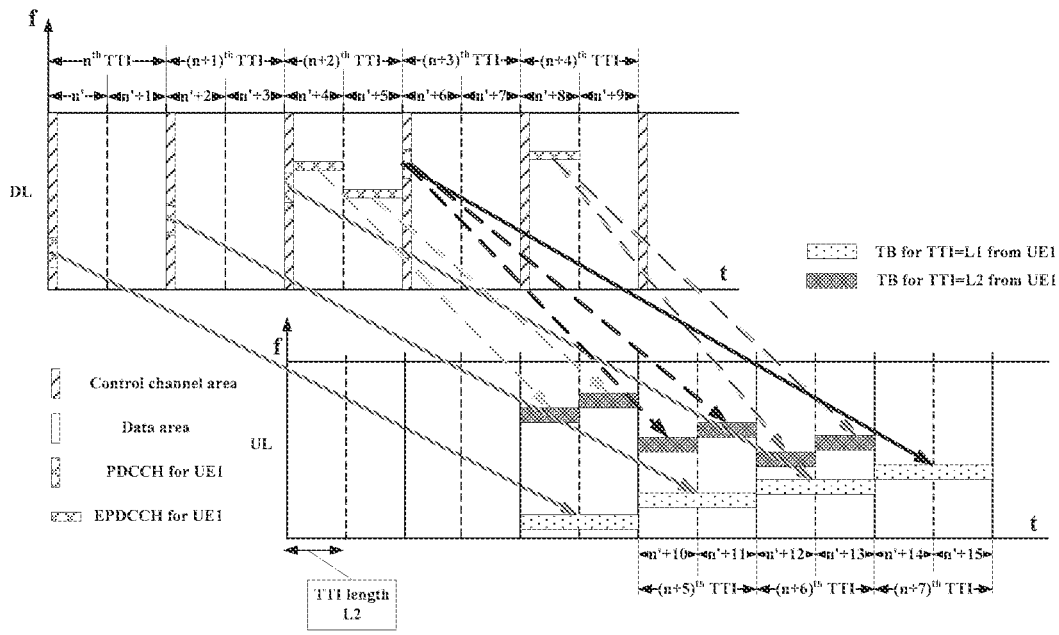
FIG. 3 is a schematic diagram of data transmission of a UE configured with two types of TTI lengths.

FIG. 3 is a schematic diagram of scheduling and data transmission in a case where a user equipment UE1 is configured with two types of TTI lengths. As shown in FIG. 3, for a UL grant of a corresponding TTI length of L1 scheduled at an n-th TTI of length L1, the UE1 transmits uplink data at an (n+4)-th TTI of length L1; for a UL grant of a corresponding TTI length of L1 scheduled at an (n+1)-th TTI of length L1, the UE1 transmits uplink data at an (n+5)-th TTI of length L1; for a UL grant of a corresponding TTI length of L1 scheduled at an (n+2)-th TTI of length L1, the UE1 transmits uplink data at an (n+6)-th TTI of length L1; for a UL grant of a corresponding TTI length of L2 scheduled at an (n'+4)-th TTI of length L2, the UE1 transmits uplink data at an (n'+8)-th TTI of length L2; for a UL grant of a corresponding length of L2 scheduled at an (n'+5)-th TTI of length L2, the UE1 transmits uplink data at an (n'+9)-th TTI of length L2; for three UL grants scheduled at an (n+3)-th TTI of length L1, their corresponding TTI lengths are L1, L2 and L2, respectively, and the UE1 transmits uplink data at an (n+7)-th TTI of length L1, an (n'+10)-th TTI of length L2, and an (n'+11)-th TTI of length L2; and for two UL grants scheduled at the (n'+8)-th TTI of length L2, their corresponding TTI lengths are all L2, and the UE1 transmits uplink data at an (n'+12)-th TTI and an (n'+13)-th TTI. In the example shown in FIG. 3, it is assumed that L1 is 1 ms and L2 is 0.5 ms, and it can be seen from FIG. 3 that uplink data transmission to which the UL grant for the TTI of length L1 and the UL grant for the TTI of length L2 correspond and scheduled by the eNB may be temporally overlapped, that is, the UE may transmit more than one TBs at the same moment, and TTI lengths for transmitting the TBs are different.

As shown in FIG. 3, three UL grants are scheduled at the (n+3)-th TTI of length L1, in which TTI lengths to which two UL grants correspond are identical, which are both 0.5 ms, and positions of uplink data transmission to which they correspond are the (n'+10)-th TTI of length 0.5 ms and the (n'+11)-th TTI of length 0.5 ms. TTI length to which the rest UL grant corresponds is 1 ms, and a position of uplink data transmission to which it corresponds is the (n+7)-th TTI of length 1 ms.

Referring to FIG. 3 again, two UL grants are scheduled at the (n'+8)-th TTI of length L2, the TTI lengths to which they correspond are identical, which are both 0.5 ms, the uplink data transmission to which the two UL grants with identical TTI lengths correspond is at different TTIs, and in this example, positions of the uplink data transmission to which the two UL grants correspond are at the (n'+12)-th TTI of length 0.5 ms and the (n'+13)-th TTI of length 0.5 ms.

In FIG. 3, downlink control channels carrying the above UL grants may be PDCCHs, or may be EPDCCHs. And when multiple UL grants of the UE1 are scheduled at one TTI, the multiple UL grants may be scheduled via one DCI, or may be scheduled via multiple DCI.

It can be seen from the example shown in FIG. 3 that the UE may multiplex packets of traffics applicable to different TTI lengths into different TBs for transmission, and occurrence of being unable to fully use resources is avoided.

In this embodiment, as shown in FIG. 2, the apparatus may further include a notifying unit 203 configured to, when the UE needs to be handed over, notify a target eNB of TTI length to which each DRB of the UE is applicable. A particular method of notification is not limited in this embodiment.

With the apparatus of this embodiment, multiplexing packets of traffics applicable to different TTI lengths by the user equipment to the same transport block for transmission may be avoided, and occurrence of being unable to fully use resources may also be avoided.

Embodiment 2

Figure 4:
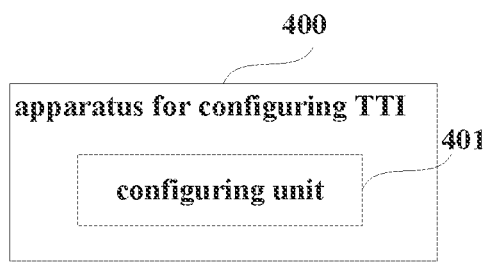
FIG. 4 is a schematic diagram of a structure of another implementation of the apparatus for configuring TTI of the embodiment of this disclosure.

The embodiment of this disclosure provides an apparatus for configuring TTI, applicable to an eNB. FIG. 4 is a schematic diagram of the apparatus. As shown in FIG. 4, the apparatus 400 includes a configuring unit 401.

In this embodiment, functions of the configuring unit 401 are identical to those of the configuring unit 201 in Embodiment 1, the contents of which being incorporated herein, and being not going to be described herein any further.

With the apparatus of this embodiment, when configuring a DRB for a UE, the eNB indicates the TTI length used for scheduling and transmission to which the DRB is applicable to the UE. Hence, the UE will not multiplex packets of traffics applicable to different TTI lengths into the same TB, and in a case where the UE has multiple traffics and different traffics are suitable for being scheduled and transmitted with different TTI lengths, the UE may transmit multiple TBs at the same moment, thereby avoiding occurrence of being unable to fully use resources.

Embodiment 3

Figure 5:
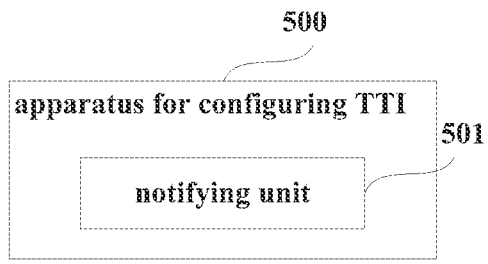
FIG. 5 is a schematic diagram of a structure of a further implementation of the apparatus for configuring TTI of the embodiment of this disclosure.

The embodiment of this disclosure provides an apparatus for configuring TTI, applicable to an eNB. FIG. 5 is a schematic diagram of the apparatus. As shown in FIG. 5, the apparatus 500 includes a notifying unit 501 configured to, when a UE needs to be handed over, notify a target eNB of TTI length to which each DRB of the UE is applicable.

In this embodiment, the TTI length used by each DRB of the UE is preconfigured by the eNB for the UE. For example, the eNB may configure the UE with the DRBs and the TTI lengths to which the DRBs are applicable by using the method of Embodiment 1; however, this embodiment is not limited thereto.

With the apparatus of this embodiment, when handover of the UE occurs, a source eNB will notify the TTI length to which each DRB configured for the UE corresponds to a target eNB, so that the target eNB provides corresponding services to the UE accordingly.

Embodiment 4

Figure 6:
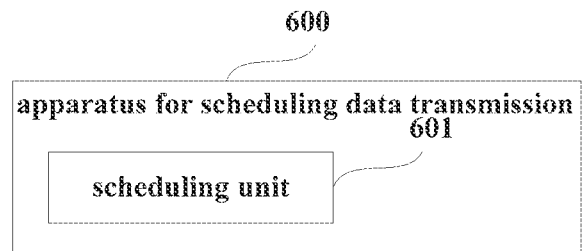
FIG. 6 is a schematic diagram of a structure of an apparatus for scheduling data transmission of the embodiment of this disclosure.

The embodiment of this disclosure provides an apparatus for scheduling data transmission, applicable to an eNB. FIG. 6 is a schematic diagram of a structure of the apparatus. As shown in FIG. 6, the apparatus 600 includes a scheduling unit 601 configured to schedule one or more uplink grants of a UE, each uplink grant corresponding to one type of TTI length.

In this embodiment, after configuring the UE with DRBs and indicating TTI lengths to which the configured DRBs are applicable to the UE, the eNB may schedule one or more uplink grants of the UE. As each uplink grant corresponds to one type of TTI length, the UE may multiplex packets of traffics using different TTI lengths into different TBs for transmission. And at the same moment, the UE may transmit multiple TBs, thereby avoiding occurrence of being unable to fully use resources.

In this embodiment, similar to Embodiment 1, the TTI length to which the uplink grant corresponds may be explicitly indicated by fields in downlink control information scheduling the uplink grant, or may be implicitly indicated by a control channel scheduling the uplink grant, or may be implicitly indicated by a serving cell for the uplink grant, with particulars being as those described above, and being not going to be described herein any further.

In this embodiment, similar to Embodiment 1, when the scheduling unit 601 schedules the multiple uplink grants of the UE, the uplink grants may be scheduled by one DCI, or may be scheduled by multiple DCI, and FIG. 3 gives an example of scheduling three uplink grants of the UE by one DCI.

In this embodiment, similar to Embodiment 1, a position of uplink data transmission to which the uplink grant corresponds is an m-th TTI starting from TTI scheduling the uplink grant, m being a product of length of the TTI and a predetermined value. The predetermined value here may be 4, or 5, or another predetermined value.

In this embodiment, similar to Embodiment 1, uplink data transmission to which uplink grants scheduled at different TTIs may be overlapped or not temporally.

With the apparatus of this embodiment, multiplexing packets of traffics applicable to different TTI lengths by the user equipment to the same transport block for transmission may be avoided, and occurrence of being unable to fully use resources may also be avoided.

Embodiment 5

Figure 7:
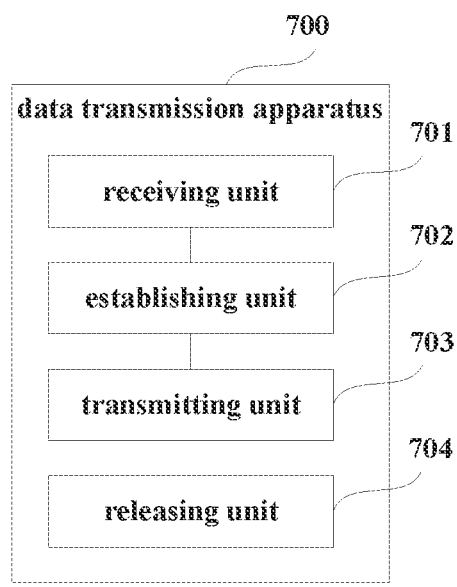
FIG. 7 is a schematic diagram of a structure of a data transmission apparatus of the embodiment of this disclosure.

The embodiment of this disclosure provides a data transmission apparatus, which is applicable to a UE, and is processing at the UE side corresponding to the apparatus in Embodiment 1. FIG. 7 is a schematic diagram of a structure of the apparatus. Referring to FIG. 7, the apparatus 700 includes a receiving unit 701, an establishing unit 702 and a transmitting unit 703.

In this embodiment, the receiving unit 701 is configured to receive configuration information about DRBs transmitted by an eNB, the configuration information about DRBs indicating TI length to which each DRB configured by the eNB for the UE corresponds. As the configuration information about DRBs has been described in Embodiment 1, the contents of which are incorporated herein, which shall not be described herein any further.

In this embodiment, the establishing unit 702 is configured to, corresponding to each TTI length, establish a data processing entity of MAC layer and an uplink shared channel. In this embodiment, the function of the established data processing entity of MAC layer is to perform processing including logical channel priority processing, multiplexing/demultiplexing, and hybrid automatic repeat, etc., on uplink transmission data by using TTI lengths to which they correspond. Hence, the data processing entity here includes, for example, a logical channel priority processing entity, a multiplexing/demultiplexing entity, and a hybrid automatic repeat request (HARD) entity; however, this embodiment is not limited thereto. In this embodiment, the function of the established uplink shared channel is to transfer TBs obtained by processing by the data processing entity of MAC layer to which it corresponds to a physical layer via the channel, so that the physical layer learns after receiving a TB which TTI length and which corresponding uplink grant should be used to transmit the TB.

Figure 8:
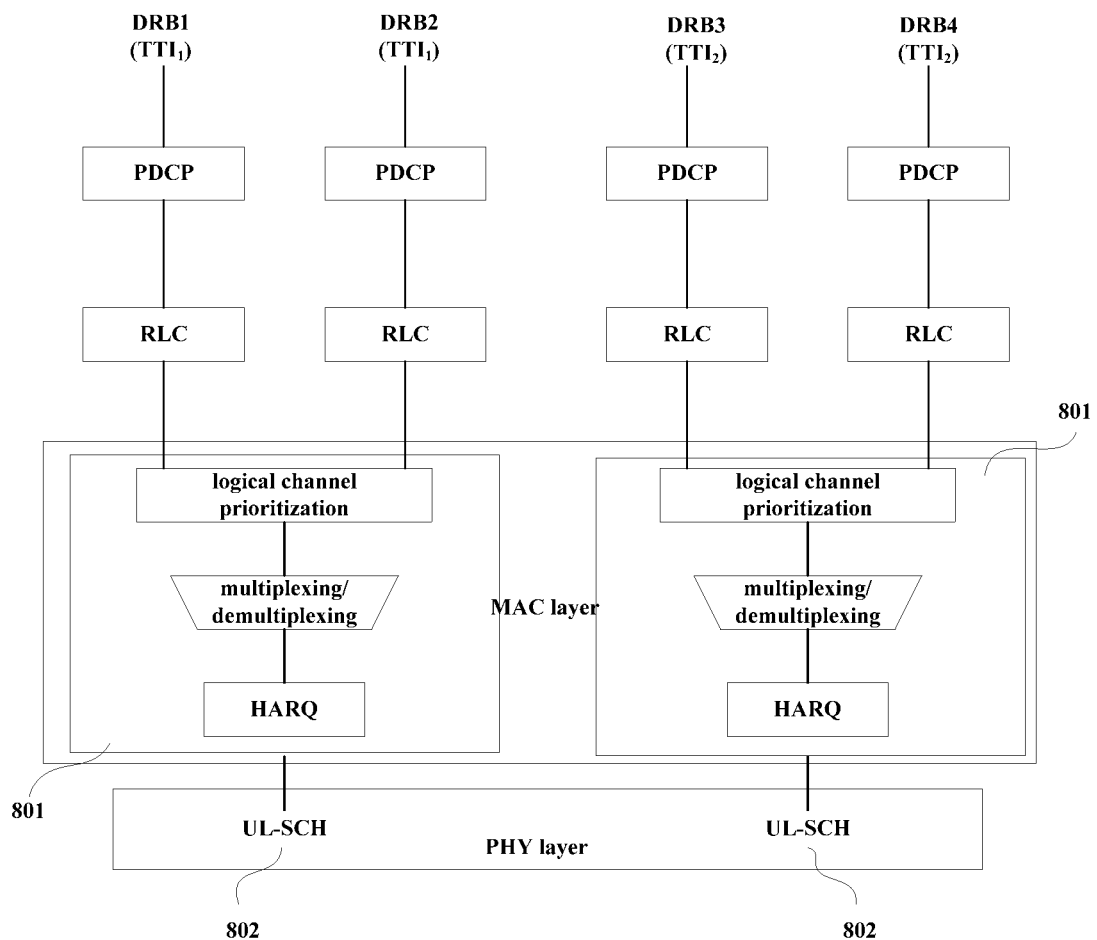
FIG. 8 is an architecture diagram of a user plane where DRBs are configured with multiple TTI lengths at a UE side.

FIG. 8 is an architecture diagram of a user plane in a case where DRBs are configured with multiple TTI lengths at a UE side. As shown in FIG. 8, four DRBs are configured by the eNB for the UE. In this example, the TTI length applicable to DRB1 and DRB2 is $TTI_1$, and the TTI length applicable to DRB3 and DRB4 is $TTI_2$. For each TTI length, the establishing unit 702 establishes a data processing entity 801 of media access control (MAC) layer and an uplink shared channel 802. Hence, the MAC layer of the UE may respectively perform such processing as logical channel priority processing, multiplexing/demultiplexing, and hybrid automatic repeat, etc., on data to be transmitted according to TTI lengths applicable to the data to be transmitted, and transfers the TBs to the physical layer via corresponding uplink shared channels.

In this embodiment, the transmitting unit 703 is configured to transmit data according to a received uplink grant by using the established data processing entity of MAC layer and the uplink shared channel corresponding to each TTI length.

Figure 9:
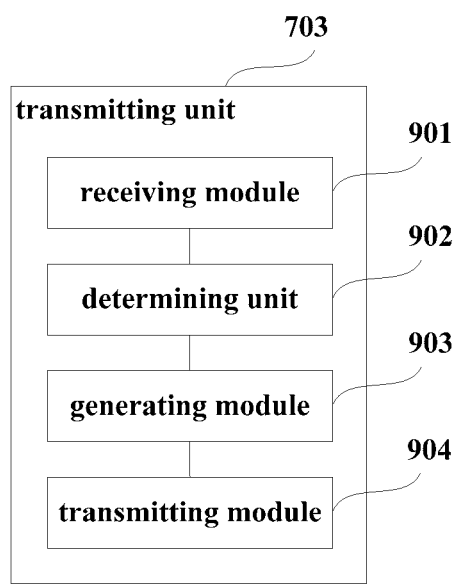
FIG. 9 is a schematic diagram of a structure of one implementation of a transmitting unit.

FIG. 9 is a schematic diagram of a structure of one implementation of the transmitting unit 703. As shown in FIG. 9, the transmitting unit 703 includes a receiving module 901, a determining module 902, a generating module 903 and a transmitting module 904.

In this implementation, the receiving module 901 is configured to receive an uplink grant. The relevant art may be referred to for a method for transmitting the uplink grant.

In this implementation, the determining module 902 is configured to determine TTI length to which the uplink grant corresponds.

As described above, the TTI length to which the uplink grant corresponds may be indicated in multiple manners, and the determining module 902 determines the TTI length to which the uplink grant corresponds according to an indication manner of the TTI length to which the uplink grant corresponds.

For example, the determining module 902 may obtain the TTI length to which the uplink grant corresponds from a field used for indicating the TTI length to which the uplink grant corresponds in downlink control information scheduling the uplink grant.

For another example, the determining module 902 may determine the TTI length to which the uplink grant corresponds according to whether the downlink control information scheduling the uplink grant is a PDCCH or an EPDCCH. For example, if a PDCCH carries the uplink grant, it is deemed that the TTI length to which the uplink grant corresponds is 1 ms, and if an EPDCCH carries the uplink grant, it is deemed that the TTI length to which the uplink grant corresponds is 0.5 ms, and vice versa.

For a further example, the determining module 902 may determine the TTI length to which the uplink grant corresponds according to a serving cell for the uplink grant. For example, if the serving cell for the uplink grant is a primary serving cell, it is deemed that the TTI length to which the uplink grant corresponds is 1 ms, and if the serving cell for the uplink grant is a secondary serving cell, it is deemed that the TTI length to which the uplink grant corresponds is 0.5 ms.

What is described above is illustrative only, and this embodiment is not limited thereto.

In this implementation, the generating module 903 is configured to generate a media access control protocol data unit (MAC PDU) by acquiring data from a DRB to which the TTI length corresponds.

In this implementation, the transmitting module 904 is configured to transmit the MAC PDU at an m-th TTI starting from the TTI receiving the uplink grant, m being a product of length of the TTI and a predetermined value.

For example, if the receiving module 901 receives the uplink grant at an n-th TTI of length $k_1$ and the determining module 902 determines that the TTI length to which the uplink grant corresponds is $k_1$, the generating module 903 generate an MAC PDU1 by acquiring data from a DRB with the TTI length of $k_1$ configured by the eNB for the UE. Thus, the transmitting module 904 may transmit the MAC PDU1 at an $(n+k_1*t)$-th TTI of length $k_1$, t being a predetermined value, which may be 4, or 5, or another value.

For another example, if the receiving module 901 receives the uplink grant at an n'-th TTI of length $k_2$ and the determining module 902 determines that the TTI length to which the uplink grant corresponds is $k_2$, the generating module 903 generate an MAC PDU2 by acquiring data from a DRB with the TTI length of $k_2$ configured by the eNB for the UE. Thus, the transmitting module 904 may transmit the MAC PDU2 at an $(n'+k_2*t)$-th TTI of length $k_2$, t being a predetermined value, which may be 4, or 5, or another value.

In this implementation, transmission of the MAC PDU1 and transmission of the MAC PDU2 may be overlapped temporally.

In this embodiment, as shown in FIG. 7, the apparatus 700 may further include a releasing unit 704 configured to, when the UE initiates RRC connection reestablishment, release data processing entities of MAC layers and uplink shared channels to which other TTI lengths than a default TTI length correspond.

In this embodiment, when the UE initiates RRC connection reestablishment, a configured default TTI length is applied for all the configured DRBs, and the apparatus 700 may release all following configuration to which the other TTI lengths than the configured default TTI length correspond: a logic channel prioritization entity, a multiplexing/demultiplexing entity, an HARQ entity, and an uplink shared channel. The configured default TTI length here may be 1 ms.

With the apparatus of this embodiment, multiplexing packets of traffics applicable to different TTI lengths by the user equipment to the same transport block for transmission may be avoided, and occurrence of being unable to fully use resources may also be avoided.

Embodiment 6

Figure 10:
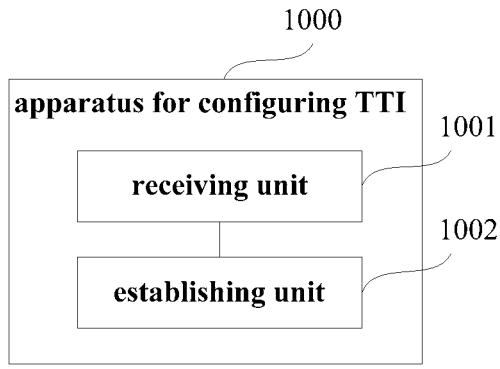
FIG. 10 is a schematic diagram of a structure of still another implementation of the apparatus for configuring TTI of the embodiment of this disclosure.

The embodiment of this disclosure provides an apparatus for configuring TTI, which is applicable to a UE, and is processing at the UE side corresponding to the apparatus in Embodiment 2. FIG. 10 is a schematic diagram of a structure of the apparatus. Referring to FIG. 10, the apparatus 1000 includes a receiving unit 1001 and an establishing unit 1002.

In this embodiment, functions of the receiving unit 1001 and the establishing unit 1002 are identical to those of the receiving unit 701 and the establishing unit 702 in Embodiment 5, the contents of which being incorporated herein, and being not going to be described herein any further.

With the apparatus of this embodiment, a data processing entity of MAC layer and an uplink shared channel corresponding to each TTI length are established according to TTI lengths applicable to different DRBs. Hence, the UE may multiplex packets of traffics applicable to different TTI lengths to different transport blocks for transmission, and occurrence of being unable to fully use resources is avoided.

Embodiment 7

Figure 11:
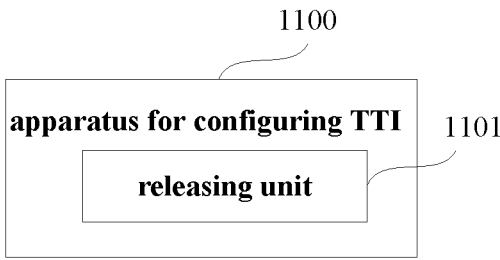
FIG. 11 is a schematic diagram of a structure of yet another implementation of the apparatus for configuring TTI of the embodiment of this disclosure.

The embodiment of this disclosure provides an apparatus for configuring TTI, which is applicable to a UE. FIG. 11 is a schematic diagram of a structure of the apparatus. Referring to FIG. 11, the apparatus 1100 includes a releasing unit 1101.

In this embodiment, function of the releasing unit 1101 is identical to that of the releasing unit 704 in Embodiment 5, the contents of which being incorporated herein, and being not going to be described herein any further.

With the apparatus of this embodiment, when the UE initiates RRC connection reestablishment, a configured default TTI length is applied for all the configured DRBs, and configuration to which the other TTI lengths correspond is released, so as to prevent the UE from transmitting data in a new serving cell by using a wrong TTI length. For example, the configured default TTI length may be TTI of length 1 ms.

Embodiment 8

The embodiment of this disclosure provides a method for configuring TTI, applicable to an eNB. As principles of the method are similar to that of the apparatus in Embodiment 1, the implantation of the apparatus in Embodiment 1 may be referred to for implementation of the method, with identical contents being not going to be described herein any further.

Figure 12:
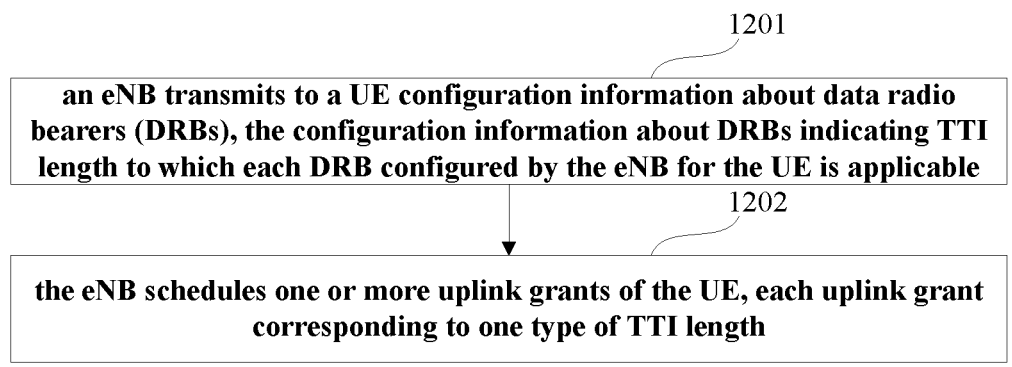
FIG. 12 is a flowchart of one implementation of a method for configuring TTI of an embodiment of this disclosure.

FIG. 12 is a flowchart of the method. As shown in FIG. 12, the method includes:

step 1201: an eNB transmits to a UE configuration information about data radio bearers (DRBs), the configuration information about DRBs indicating TTI length to which each DRB configured by the eNB for the UE is applicable.

In this embodiment, the DRBs configured by the eNB for the UE may be applicable to different TTI lengths. Hence, the UE may multiplex packets of traffics applicable to different TTI lengths into different TBs for transmission.

In one implementation of this embodiment, as shown in FIG. 12, the method further includes:

step 1202: the eNB schedules one or more uplink grants of the UE, each uplink grant corresponding to one type of TTI length.

In this implementation, as each uplink grant corresponds to one type of TTI length and different uplink grants may correspond to different TTI lengths, the UE may transmit packets of traffics applicable to different TTI lengths by using different uplink grants, and may transmit multiple TBs at the same moment.

In this implementation, the TTI length to which the uplink grant corresponds may be explicitly indicated by a field in downlink control information scheduling the uplink grant, or may be indicated by a type of a control channel scheduling the uplink grant, or may be indicated by a type of a serving cell for the uplink grant, with particulars being as described above, which shall not be described herein any further.

In this implementation, when the eNB schedules more uplink grants of the UE, the uplink grants may be scheduled via one or more downlink control information.

In this implementation, uplink data transmission to which the uplink grant corresponds occurs at an m-th TTI starting from TTI scheduling the uplink grant, the length of the TTI being the length of the TTI to which the uplink grant corresponds, and a value of m being predetermined, which is, for example, 4, or 5, with particulars being as described above, which shall not be described herein any further.

In this implementation, uplink data transmission to which uplink grants scheduled at different TTIs may be overlapped or not temporally, with particulars being as described above, which shall not be described herein any further.

In this embodiment, when the UE needs to be handed over, the eNB may notify a target eNB of the TTI length to which each DRB of the UE is applicable.

With the method of this embodiment, multiplexing packets of traffics applicable to different TTI lengths by the user equipment to the same transport block for transmission may be avoided, and occurrence of being unable to fully use resources may also be avoided.

Embodiment 9

Figure 13:
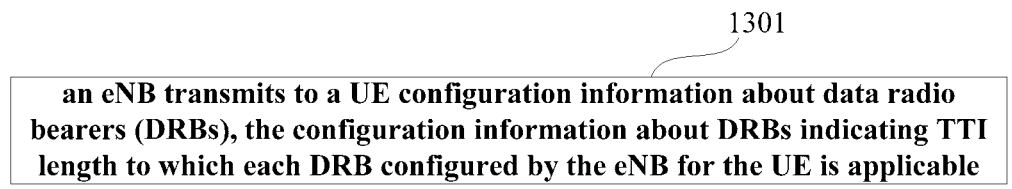
FIG. 13 is a flowchart of another implementation of the method for configuring TTI of the embodiment of this disclosure.

The embodiment of this disclosure provides a method for configuring TTI, applicable to an eNB. As principles of the method are similar to that of the apparatus in Embodiment 2, the implantation of the apparatus in Embodiment 2 may be referred to for implementation of the method, with identical contents being not going to be described herein any further. FIG. 13 is a flowchart of the method. As shown in FIG. 13, the method includes:

step 1301: an eNB transmits to a UE configuration information about data radio bearers (DRBs), the configuration information about DRBs indicating TTI length to which each DRB configured by the eNB for the UE is applicable.

With the method of this embodiment, when the UE is configured with DRBs, the UE is notified of the TTI lengths used by the DRBs. Hence, the UE may multiplex packets of traffics applicable to different TTI lengths into different TBs for transmission, thereby solving the problem pointed out in the Background.

Embodiment 10

Figure 14:
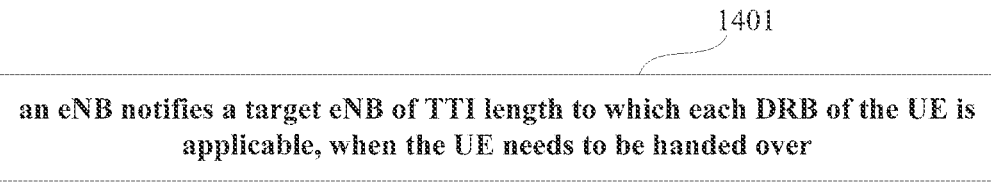
FIG. 14 is a flowchart of a further implementation of the method for configuring TTI of the embodiment of this disclosure.

The embodiment of this disclosure provides a method for configuring TTI, applicable to an eNB. As principles of the method are similar to that of the apparatus in Embodiment 3, the implantation of the apparatus in Embodiment 3 may be referred to for implementation of the method, with identical contents being not going to be described herein any further. FIG. 14 is a flowchart of the method. As shown in FIG. 14, the method includes:

step 1401: an eNB notifies a target eNB of TTI length to which each DRB of the UE is applicable, when the UE needs to be handed over.

With the method of this embodiment, when the UE needs to be handed over, the source eNB notifies the target eNB of the TTI length to which each DRB of the UE is applicable, thereby ensuring continuity of traffics.

Embodiment 11

The embodiment of this disclosure provides a method for scheduling data transmission, applicable to an eNB. As principles of the method are similar to that of the apparatus in Embodiment 4, the implantation of the apparatus in Embodiment 4 may be referred to for implementation of the method, with identical contents being not going to be described herein any further.

Figure 15:
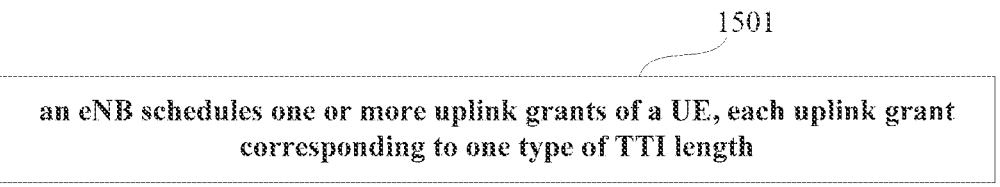
FIG. 15 is a flowchart of a method for scheduling data transmission of an embodiment of this disclosure.

FIG. 15 is a flowchart of the method. As shown in FIG. 15, the method includes:

step 1501: an eNB schedules one or more uplink grants of a UE, each uplink grant corresponding to one type of TTI length.

In this embodiment, after configuring the UE with DRBs and indicating TTI lengths to which the configured DRBs are applicable to the UE, the eNB may schedule one or more uplink grants of the UE. As each uplink grant corresponds to one type of TTI length, the UE may multiplex packets of traffics using different TTI lengths into different TBs for transmission. And at the same moment, the UE may transmit multiple TBs, thereby avoiding occurrence of being unable to fully use resources.

In this embodiment, similar to Embodiment 1, the TTI length to which the uplink grant corresponds may be explicitly indicated by fields in downlink control information scheduling the uplink grant, or may be indicated by a type of a control channel scheduling the uplink grant, or may be implicitly indicated by a serving cell for the uplink grant, with particulars being as those described above, and being not going to be described herein any further.

In this embodiment, similar to Embodiment 1, when the eNB schedules multiple uplink grants of the UE, the multiple uplink grants may be scheduled by one DCI, or may be scheduled by multiple DCI, and FIG. 3 gives an example of scheduling three uplink grants of the UE by one DCI.

In this embodiment, similar to Embodiment 1, a position of uplink data transmission to which the uplink grant corresponds is at an m-th TTI starting from TTI scheduling the uplink grant, m being a predetermined value, which may be 4, or 5, or another predetermined value.

In this embodiment, similar to Embodiment 1, uplink data transmission to which uplink grants scheduled at different TTIs may be overlapped or not temporally.

With the method of this embodiment, multiplexing packets of traffics applicable to different TTI lengths by the user equipment to the same transport block for transmission may be avoided, and occurrence of being unable to fully use resources may also be avoided.

Embodiment 12

The embodiment of this disclosure provides a data transmission method, applicable to a UE. As principles of the method are similar to that of the apparatus in Embodiment 5, the implantation of the apparatus in Embodiment 5 may be referred to for implementation of the method, with identical contents being not going to be described herein any further.

Figure 16:
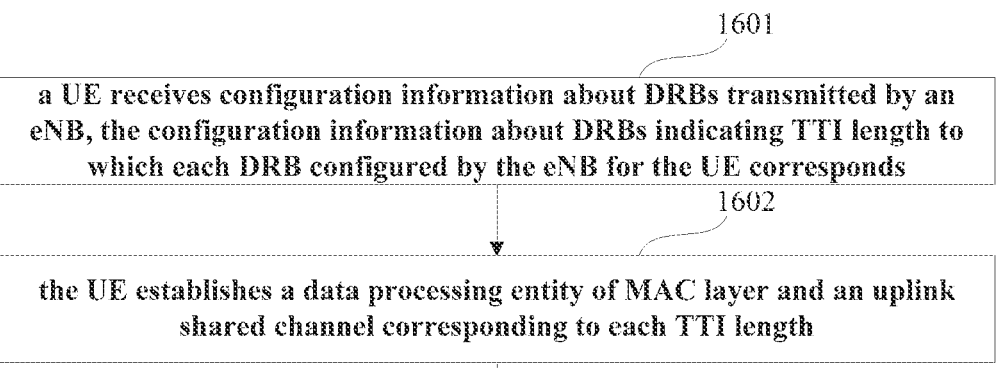
FIG. 16 is a flowchart of a data transmission method of an embodiment of this disclosure.
Figure 16:
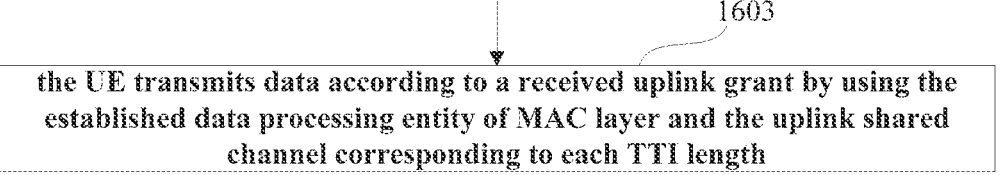

FIG. 16 is a flowchart of the method. As shown in FIG. 16, the method includes: step 1601: a UE receives configuration information about DRBs transmitted by an eNB, the configuration information about DRBs indicating TTI length to which each DRB configured by the eNB for the UE corresponds;

step 1602: the UE establishes a data processing entity of MAC layer and an uplink shared channel corresponding to each TTI length;

the data processing entity here may include a logic channel prioritization entity, a multiplexing/demultiplexing entity, and an HARQ entity;

step 1603: the UE transmits data according to a received uplink grant by using the established data processing entity of MAC layer and the uplink shared channel corresponding to each TTI length.

Figure 17:
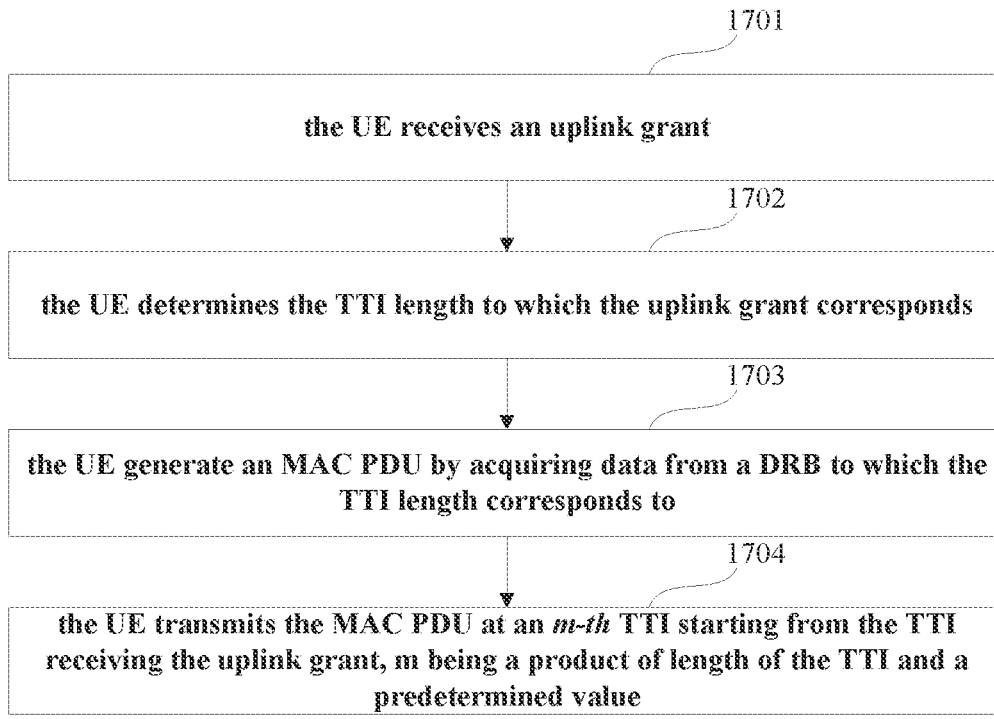
FIG. 17 is a flowchart of performing data transmission.

FIG. 17 is a flowchart of one implementation of step 1603. As shown in FIG. 17, the method includes:

step 1701: the UE receives an uplink grant;

step 1702: the UE determines the TTI length to which the uplink grant corresponds;

step 1703: the UE generate an MAC PDU by acquiring data from a DRB to which the TTI length corresponds to; and step 1704: the UE transmits the MAC PDU at an m-th TTI starting from the TTI receiving the uplink grant, m being a product of length of the TTI and a predetermined value.

In step 1701, a method for transmitting the uplink grant is not limited.

In step 1702, the TTI length to which the uplink grant corresponds may be determined according to an indication method of the TTI length, with particulars being as described above, which shall not be described herein any further.

In step 1703, a method for generating the MAC PDU is not limited.

In step 1704, the MAC PDU may be transmitted at the TTI for transmitting the uplink data to which the uplink grant corresponds.

In this embodiment, when the UE initiates RRC connection reestablishment, it may release configuration to which other TTI lengths than a default TTI length correspond, such as data processing entities of MAC layers and uplink shared channels.

With the method of this embodiment, multiplexing packets of traffics applicable to different TTI lengths by the user equipment to the same transport block for transmission may be avoided, and occurrence of being unable to fully use resources may also be avoided.

Embodiment 13

Figure 18:
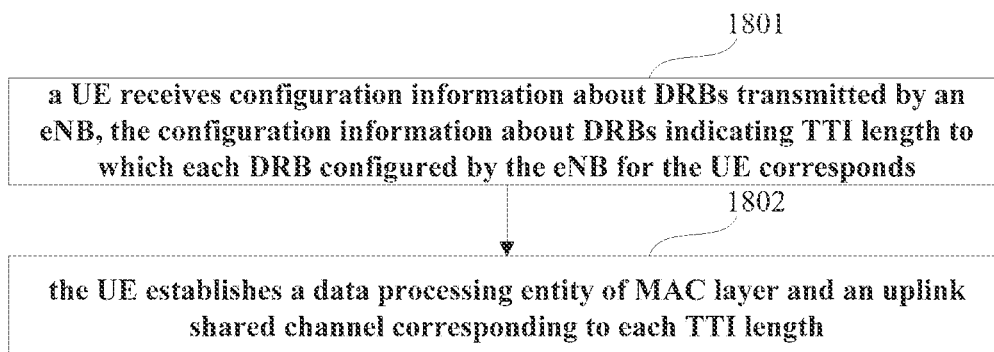
FIG. 18 is a flowchart of still another implementation of the method for configuring TTI of the embodiment of this disclosure.

The embodiment of this disclosure provides a method for configuring TTI, applicable to a UE. As principles of the method are similar to that of the apparatus in Embodiment 6, the implantation of the apparatus in Embodiment 6 may be referred to for implementation of the method, with identical contents being not going to be described herein any further. FIG. 18 is a flowchart of the method. As shown in FIG. 18, the method includes:

step 1801: a UE receives configuration information about DRBs transmitted by an eNB, the configuration information about DRBs indicating TTI length to which each DRB configured by the eNB for the UE corresponds; and step 1802: the UE establishes a data processing entity of MAC layer and an uplink shared channel corresponding to each TTI length.

In this embodiment, processing in steps 1801 and 1802 are identical to those in steps 1601 and 1602 in Embodiment 12, the contents of which being incorporated herein, which shall not be described herein any further.

With the method of this embodiment, a data processing entity of MAC layer and an uplink shared channel corresponding to each TTI length are established according to TTI lengths applicable to different DRBs. Hence, the UE may multiplex packets of traffics applicable to different TTI lengths to different transport blocks for transmission, and occurrence of being unable to fully use resources is avoided.

Embodiment 14

Figure 19:
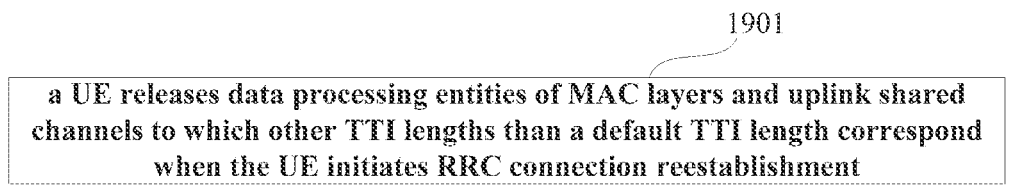
FIG. 19 is a flowchart of yet another implementation of the method for configuring TTI of the embodiment of this disclosure.

The embodiment of this disclosure provides a method for configuring TTI, applicable to a UE. As principles of the method are similar to that of the apparatus in Embodiment 7, the implantation of the apparatus in Embodiment 7 may be referred to for implementation of the method, with identical contents being not going to be described herein any further. FIG. 19 is a flowchart of the method. As shown in FIG. 19, the method includes:

step 1901: a UE releases data processing entities of MAC layers and uplink shared channels to which other TTI lengths than a default TTI length correspond when the UE initiates RRC connection reestablishment.

In this embodiment, processing in step 1901 is identical to that in Embodiment 12, the contents of which being incorporated herein, which shall not be described herein any further.

With the method of this embodiment, when the UE initiates RRC connection reestablishment, a configured default TTI length is applied for all the configured DRBs, and configuration to which the other TTI lengths correspond is released, which may ensure continuity of traffics.

Embodiment 15

The embodiment of this disclosure further provides an eNB, which may include the apparatus described in embodiments 1-4.

Figure 20:
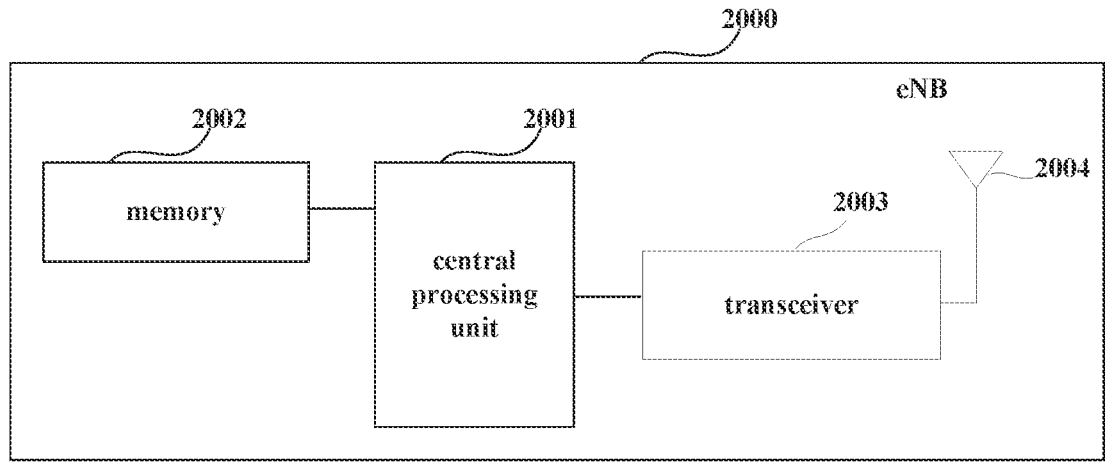
FIG. 20 is a schematic diagram of a hardware structure of an eNB of an embodiment.

FIG. 20 is a schematic diagram of a structure of the eNB of the embodiment of this disclosure. As shown in FIG. 20, the eNB 2000 may include a central processing unit (CPU) 2001 and a memory 2002, the memory 2002 being coupled to the central processing unit 2001. In this embodiment, the memory 2002 may store various data, and furthermore, it may store a program for information processing, and execute the program under control of the central processing unit 2001, so as to receive various data transmitted by UE, and transmit various data to the UE.

In one implementation, functions of the apparatus described in embodiments 1-4 may be integrated into the central processing unit 2001.

In another implementation, the apparatus described in embodiments 1-4 and the central processing unit 2001 may be configured separately. For example, the apparatus described in embodiments 1-4 may be configured as a chip connected to the central processing unit 2001, with its functions being realized under control of the central processing unit 2001.

Furthermore, as shown in FIG. 20, the eNB 2000 may include a transceiver 2003, and an antenna 2004, etc. In this embodiment, functions of the above components are similar to those in the relevant art, and shall not be described herein any further. It should be noted that the eNB 2000 does not necessarily include all the parts shown in FIG. 20, and furthermore, the eNB 2000 may include parts not shown in FIG. 20, and the relevant art may be referred to.

With the eNB of this embodiment, multiplexing packets of traffics applicable to different TTI lengths by the user equipment to the same transport block for transmission may be avoided, and occurrence of being unable to fully use resources may also be avoided.

Embodiment 16

The embodiment of this disclosure further provides a UE, including the apparatus described in embodiments 5-7.

Figure 21:
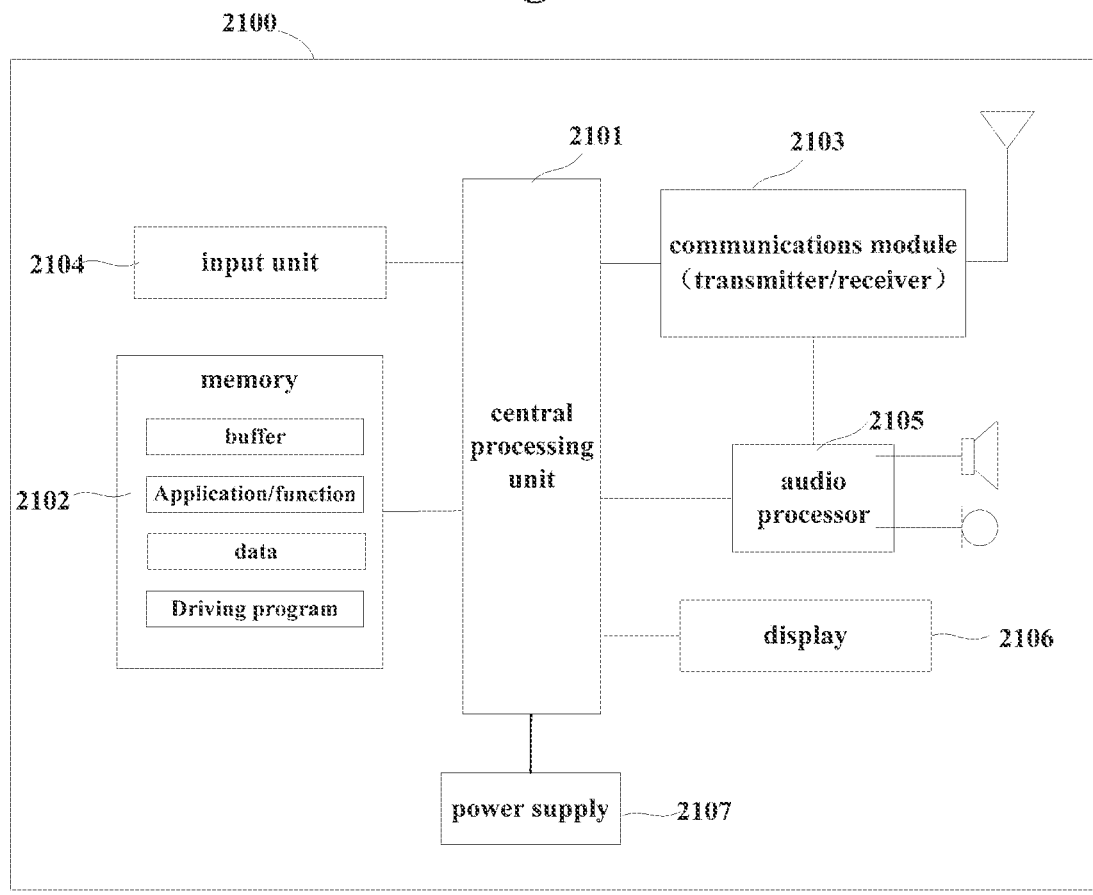
FIG. 21 is a schematic diagram of a hardware structure of a UE of an embodiment.

FIG. 21 is a schematic diagram of a structure of the UE of the embodiment of this disclosure. As shown in FIG. 21, the UE 2100 may include a central processing unit 2101 and a memory 2102, the memory 2102 being coupled to the central processing unit 2101. This figure is illustrative only, and other types of structures may also be used, so as to supplement or replace this structure and achieve a telecommunications function or other functions.

In an implementation, functions of the apparatus described in embodiments 5-7 may be integrated into the central processing unit 2101, and the central processing unit 2101 carries out the functions of the apparatus described in embodiments 5-7, and the functions of the apparatus described in embodiments 5-7 are incorporated herein, which shall not be described herein any further.

In another implementation, the apparatus described in embodiments 5-7 and the central processing unit 2101 may be configured separately. For example, the apparatus described in embodiments 5-7 may be configured as a chip connected to the central processing unit 2101, with their functions being realized under control of the central processing unit 2101.

As shown in FIG. 21, the UE 2100 may further include a communications module 2103, an input unit 2104, an audio processor 2105, a display 2106, and a power supply 2107. It should be noted that the UE 2100 does not necessarily include all the parts shown in FIG. 21, and furthermore, the UE 2100 may include parts not shown in FIG. 21, and the relevant art may be referred to.

As shown in FIG. 21, the processing unit 2101 is sometimes referred to as a controller or control, which may include a microprocessor or other processor devices and/or logic devices, and the processing unit 2101 receives input and controls operations of every components of the UE 2100.

The memory 2102 may be, for example, one or more of a buffer memory, a flash memory, a hard drive, a mobile medium, a volatile memory, a nonvolatile memory, or other suitable devices. And the central processing unit 2101 may execute programs stored in the memory 2102, so as to realize information storage or processing, etc. Functions of other parts are similar to those of the relevant art, which shall not be described herein any further. The parts of the UE 2100 may be realized by specific hardware, firmware, software, or any combination thereof, without departing from the scope of the present disclosure.

With the UE of this embodiment, multiplexing packets of traffics applicable to different TTI lengths by the user equipment to the same transport block for transmission may be avoided, and occurrence of being unable to fully use resources may also be avoided.

Embodiment 17

Figure 22:
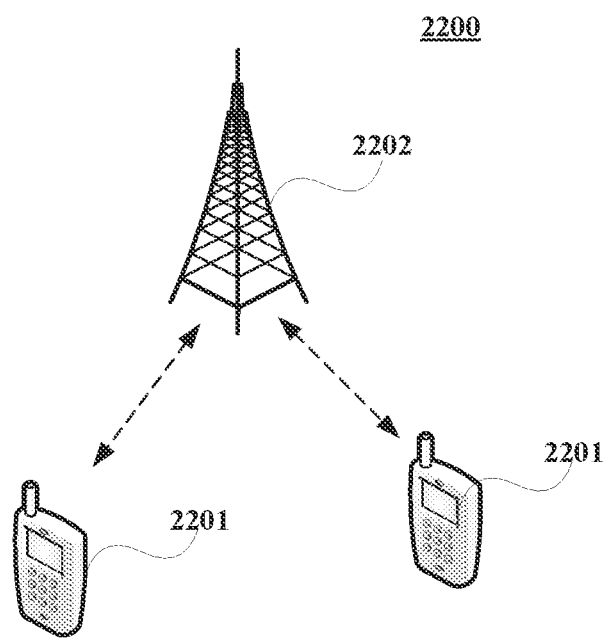
FIG. 22 is a schematic diagram of a topology of the communications system of an embodiment.

The embodiment of this disclosure further provides a communications system. FIG. 22 is a topology of the communications system. As shown in FIG. 22, the communications system 2200 includes a UE 2201 and an eNB 2202.

In this embodiment, the eNB 2202 is configured to transmit to the UE 2201 configuration information about data radio bearers (DRBs), the configuration information about DRBs indicating TTI length to which each DRB configured by the eNB 2202 for the UE 2201 is applicable. Alternatively, the eNB 2202 may further be configured to schedule one or more uplink grants of the UE 2201, each uplink grant corresponding to one type of TTI length.

In this embodiment, the eNB 2202 may employ the methods described in embodiments 8-11, that is, carrying out the function of the apparatus described in embodiments 1-4. The contents of embodiments 1-4 and embodiments 8-11 are incorporated herein, which shall not be described herein any further.

In this embodiment, the UE 2201 is configured to receive the configuration information about DRBs transmitted by the eNB 2202, and establish a data processing entity of MAC layer and an uplink shared channel corresponding to each TTI length. Alternatively, it may further transmit data using the established data processing entity of MAC layer and the uplink shared channel corresponding to each TTI length according to received uplink grant.

In this embodiment, the UE 2201 may employ the methods described in embodiments 5-7, that is, carrying out the function of the apparatus described in embodiments 12-14. The contents of embodiments 5-7 and embodiments 12-14 are incorporated herein, which shall not be described herein any further.

With the communications system of this embodiment, multiplexing packets of traffics applicable to different TTI lengths by the user equipment to the same transport block for transmission may be avoided, and occurrence of being unable to fully use resources may also be avoided.

An embodiment of the present disclosure further provides a computer readable program, which, when executed in an eNB, will cause a computer unit to carry out the method described in embodiments 8-11 in the eNB.

An embodiment of the present disclosure further provides a computer storage medium, including a computer readable program, which will cause a computer unit to carry out the method described in embodiments 8-11 in an eNB.

An embodiment of the present disclosure further provides a computer readable program, which, when executed in a UE, will cause a computer unit to carry out the method described in embodiments 12-14 in the UE.

An embodiment of the present disclosure further provides a computer storage medium, including a computer readable program, which will cause a computer unit to carry out the method described in embodiments 12-14 in a UE.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

What is claimed is:

1. A UE (User Equipment), the UE comprising:
a receiver configured to:
   receive configuration information about data radio bearers (DRBs) from a base station, the configuration information indicating Transmission Time Interval (TTI) length to which each DRBs for the UE corresponds, the DRBs being configured by radio resource control (RRC), and
   receive one or more uplink grants from the base station, each of the uplink grants of the one or more uplink grants corresponding to a TTI length different from another TTI length of other uplink grants; and
a transmitter configured to transmit data to the base station using an uplink shared channel corresponding to each TTI length according to an uplink grant in the one or more uplink grants.

2. The UE according to claim 1, further comprising:
processor circuitry configured to establish a data processing entity of media access control (MAC) layer and an uplink shared channel corresponding to each TTI length.

3. The UE according to claim 2, wherein
the processor circuitry is further configured to:
   determine TTI length to which the uplink grant corresponds;
   generate a media access control protocol data unit (MAC PDU) by acquiring data from a DRB to which the TTI length corresponds; and
   transmit the MAC PDU to the base station at an m-th TTI starting from the TTI receiving the uplink grant, length of the TTI being the TTI length to which the uplink grant corresponds, and m being a predetermined value.

4. The UE according to claim 2, wherein
the processor circuitry is further configured to release data processing entities of MAC layers and uplink shared channels to which other TTI lengths than a default TTI length correspond when the UE initiates radio resource control (RRC) connection reestablishment.

5. The UE according to claim 2, wherein the data processing entity of MAC layer comprises:
a logic channel prioritization entity, a multiplexing/demultiplexing entity, and a hybrid automatic repeat request (HARQ) entity.

6. The UE according to claim 1, wherein the received uplink grant corresponds to a TTI length different from another TTI length of another uplink grant.

7. The UE according to claim 1, wherein the DRBs are configured by the radio resource control (RRC) when a handover occurs.

8. A base station comprising:
a transmitter configured to:
   transmit, via radio resource control (RRC) signal, configuration information about data radio bearers (DRBs) to a terminal, the configuration information indicating Transmission Time Interval (TTI) length to which each DRBs for the UE corresponds, and
processor circuitry configured to schedule one or more uplink grants of the terminal, each uplink grant of the one or more uplink grants corresponding to a TTI length different from another TTI length of another uplink grant, wherein
the transmitter transmits the one or more uplink grants to the terminal.

9. A wireless communication system comprising:
a terminal; and
a base station configured to communicate with the terminal, wherein
the base station is further configured to:
   transmit, via radio resource control (RRC) signal, configuration information about data radio bearers (DRBs) to the terminal, the configuration information indicating Transmission Time Interval (TTI) length to which each DRBs for the UE corresponds,
   schedule one or more uplink grants of the terminal, each uplink grant of the one or more uplink grants corresponding to a TTI length different from another TTI length of other uplink grants, and
   transmit the one or more uplink grants to the terminal,
and the terminal is further configured to:
   receive the configuration information from the base station,
   receive the one or more uplink grants from the base station, and
   transmit data to the base station using an uplink shared channel corresponding to each TTI length according to an uplink grant in the one or more uplink grants.

* * * * *